United States Patent
Chang

(10) Patent No.: US 7,593,567 B2
(45) Date of Patent: Sep. 22, 2009

(54) TRANSFORMATION STRUCTURES FOR APPROXIMATING COLOR MATCHING FUNCTIONS

(75) Inventor: Chin Chang, Agoura Hills, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 487 days.

(21) Appl. No.: 10/538,202

(22) PCT Filed: Dec. 4, 2003

(86) PCT No.: PCT/IB03/05651

§ 371 (c)(1),
(2), (4) Date: Jun. 9, 2005

(87) PCT Pub. No.: WO2004/053438

PCT Pub. Date: Jun. 24, 2004

(65) Prior Publication Data

US 2006/0045331 A1    Mar. 2, 2006

Related U.S. Application Data

(60) Provisional application No. 60/432,892, filed on Dec. 12, 2002.

(51) Int. Cl.
*G06K 9/00* (2006.01)
*H04N 3/14* (2006.01)
*H04N 5/335* (2006.01)
*H04N 9/04* (2006.01)

(52) U.S. Cl. .................. 382/162; 382/167; 348/272; 348/273

(58) Field of Classification Search ............ 382/162, 382/167; 345/83; 348/272, 273; 430/30
See application file for complete search history.

(56) References Cited

U.S. PATENT DOCUMENTS

| 5,609,978 | A | * | 3/1997 | Giorgianni et al. | ............ 430/30 |
|---|---|---|---|---|---|
| 6,313,816 | B1 | | 11/2001 | Kojima et al. | |
| 6,833,868 | B1 | * | 12/2004 | Meynants et al. | ........... 348/272 |
| 2003/0076056 | A1 | * | 4/2003 | Schuurmans | ................ 315/291 |
| 2003/0138141 | A1 | * | 7/2003 | Quan et al. | ................ 382/162 |
| 2003/0156214 | A1 | * | 8/2003 | Guimaraes et al. | .......... 348/342 |

OTHER PUBLICATIONS

Mark W. et al. "Optimization of Sensor Response Functions for Colorimetry of Reflective and Emissive Objects", IEEE, vol. 5, No. 3, Mar. 1996.*

* cited by examiner

*Primary Examiner*—John B Strege

(57) ABSTRACT

RGB filter set and color estimation performance for RGB LED color sensing is provided. A criteria function describing an error between desired color matching functions and a spectral response of an RGB filter set is constructed. RGB filter set response characteristics based on the criteria function are then determined. Finally, color estimation parameters for substantially optimal color estimation with the RGB filter set are determined based upon the determined RGB filter set response characteristics. Computer readable code for constructing a criteria function is provided. Computer readable code for determining RGB filter set response characteristics is also provided. Finally, computer readable code for determining color estimation parameters is provided.

20 Claims, 5 Drawing Sheets

TRANSFORMATION STRUCTURES FOR APPROXIMATING COLOR MATCHING FUNCTIONS

CROSS REFERENCE TO RELATED APPLICATION

This application claims the benefit of U.S. provisional application Ser. No. 60/432,892 filed Dec. 12, 2002, which is incorporated herein by reference.

The invention relates to methods of color sensing and estimation. More particularly the invention relates to techniques for determining RGB filter set and color estimation performance for RGB LED color sensing.

BACKGROUND OF THE INVENTION

The invention relates to methods of color sensing and estimation. More particularly the invention relates to techniques for determining RGB filter set and color estimation performance for RGB LED color sensing.

In the field of color sensing it is known that any instrument or process used to distinguish or sense colors as the human eye does must have spectral responses which correspond to some linear transformation of the CIE color mixture functions $\bar{x}(\lambda)$, $\bar{y}(\lambda)$, $\bar{z}(\lambda)$. In color photography this condition is known as the Luther-Ives condition. There are infinitely many real coefficients $a_1$, $a_2$ and $a_3$, such that $C(\lambda)=a_1\bar{x}(\lambda)+a_2\bar{y}(\lambda)+a_3\bar{z}(\lambda)$, represents an equivalent new color matching function $C(\lambda)$. All functions of the $C(\lambda)$ family are equivalent under matrix transformation.

There is much greater freedom when using color filters for color sensing to approximately realize $C(\lambda)$ for a set of coefficients instead of physically realizing the CIE color matching functions. Since there are infinitely many equivalent $C(\lambda)$'s, an appropriate set of $C(\lambda)$'s must be determined for a given color filter set.

In order to be approximated by practical color filters, the new transformed color matching functions need to satisfy three conditions: 1) $C(\lambda)$ is positive or zero throughout the entire spectral range; 2) $C(\lambda)$ has a single peak; 3) the overlaps between the three $C(\lambda)$'s are as small as possible.

One transformation matrix satisfying the above conditions is the well known MacAdam's matrix given by:

$$Mc = \begin{pmatrix} 0.5115 & 0.5985 & -0.11 \\ -0.5081 & 1.4093 & 0.0988 \\ 0 & 0 & 1 \end{pmatrix}$$

The MacAdam's matrix satisfies the conditions for color matching functions that may be realized by real filters and is therefore of use in the design of filter sets for specific color sensing applications. Custom designed filters sets are particularly expensive to implement, especially when the filter must be designed in a specialized shape. For many applications of color sensing, the custom designed filters necessary for optimal estimation are too expensive. It would be desirable to provide a method of utilizing existing low cost filters for sub-optimal color sensing to overcome these and other limitations.

SUMMARY OF THE INVENTION

The present invention is directed to a system and method for determining RGB filter set and color estimation performance for RGB LED color sensing. Color filter performance for an RGB LED color sensing system is substantially optimized by determining transformation parameters to optimize spectral approximation. A calibration is provided to allow adjustment of parameters.

In accordance with the invention, a method for determining RGB filter set and color estimation performance for RGB LED color sensing is provided. Means for constructing a criteria function describing an error between desired color matching functions and a spectral response of an RGB filter set are provided. Means for determining RGB filter set response characteristics based on the criteria function are also provided. Finally, means for determining color estimation parameters for substantially optimal color estimation with the RGB filter set based upon the determined RGB filter set response characteristics are provided.

In accordance with another aspect of the invention a computer readable medium storing a computer program is provided. Computer readable code for constructing a criteria function describing an error between desired color matching functions and a spectral response of an RGB filter set is provided. Computer readable code for determining RGB filter set response characteristics based on the criteria function is also provided. Finally, computer readable code for determining color estimation parameters for substantially optimal color estimation with the RGB filter set based upon the determined RGB filter set response characteristics is provided.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENTS

Figure 1:
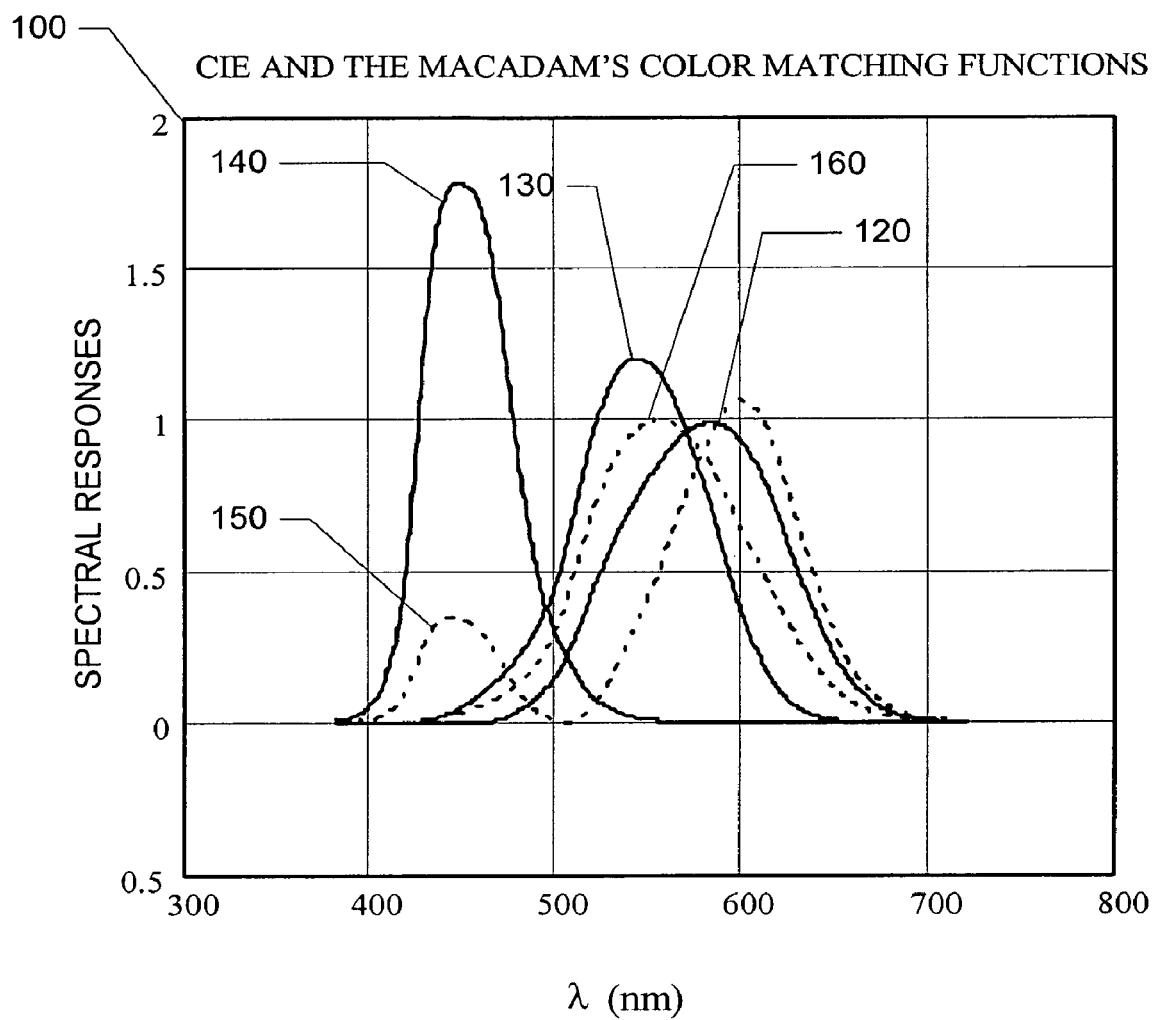
FIG. 1 shows the CIE color mixture function and the MacAdam's color matching functions.

The present invention is directed to a system and method for determining RGB filter set and color estimation performance for RGB LED color sensing. FIG. 1 contains spectral response plots of the CIE color matching functions, $\bar{x}(\lambda)$ 120, $\bar{y}(\lambda)$ 130, and $\bar{z}(\lambda)$ 140, and corresponding color matching functions $\overline{xmc}(\lambda)$ 150, $\overline{ymc}(\lambda)$ 160, and $\overline{zmc}(\lambda)$ derived from the MacAdam's matrix. Note that the function $\overline{zmc}(\lambda)$, while present, is not visible on FIG. 1 as $\bar{z}(\lambda)$ matches $\overline{zmc}(\lambda)$. FIG. 1 is provided for illustration and will be recognized by those skilled in the art.

A criteria function describing an error between desired color matching functions and a spectral response of an RGB filter set is constructed. RGB filter set response characteristics based on the criteria function are then determined. Finally, color estimation parameters for substantially optimal color estimation with the RGB filter set are determined based upon the determined RGB filter set response characteristics. Additional steps not elucidated may occur within the following description and some steps may be combined, omitted or occur in a different order without departing from the spirit and scope of the invention.

Figure 2:
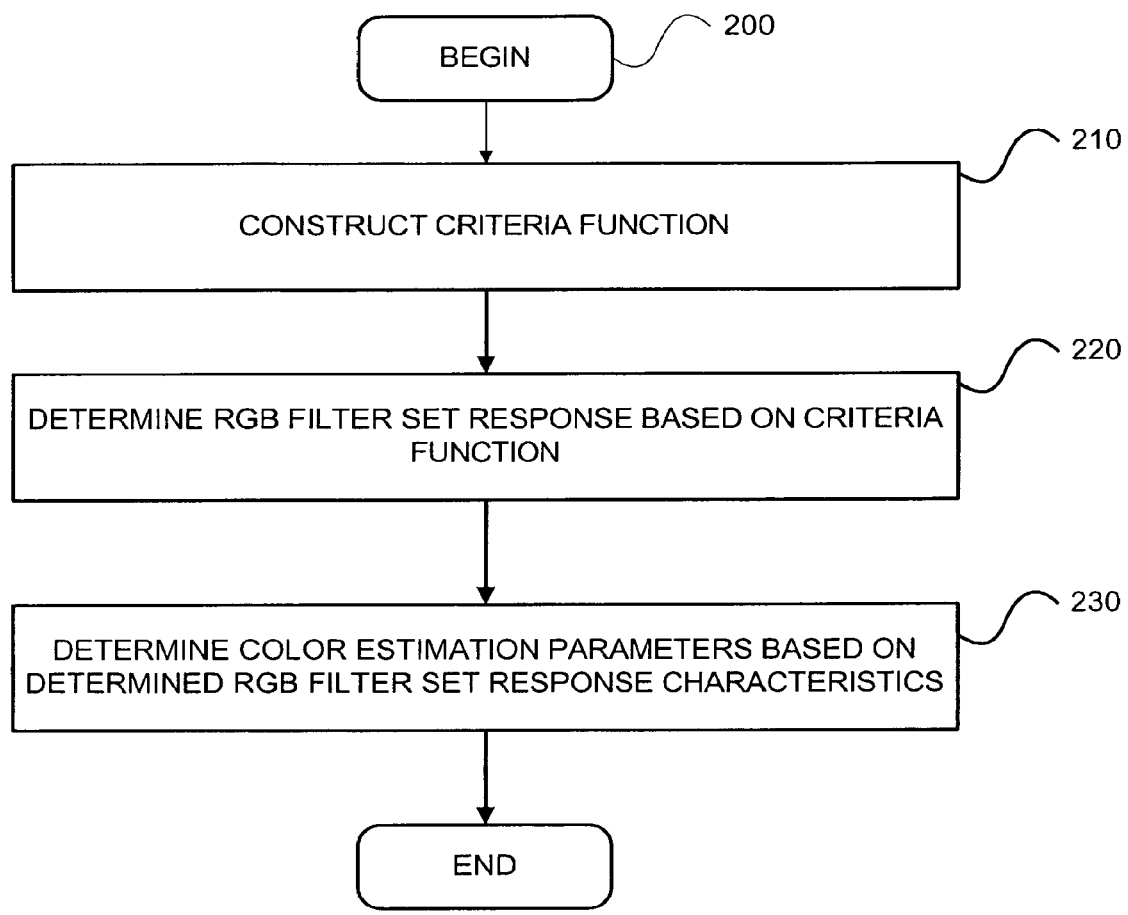
FIG. 2 is a flow diagram illustrating a method for determining RGB filter set and color estimation performance for RGB LED color sensing.

FIG. 2 shows a flow diagram illustrating a process for determining RGB filter set and color estimation performance for RGB LED color sensing. Process 200 begins in step 210. A criteria function describing an error between desired color matching functions and the spectral response of an RGB filter set is constructed in step 210. The criteria function is a linear vector function bounded over a spectral bandwidth. In general, the criteria function describes the performance of a color sensing or estimation system typically comprised of a set of color filters, a set of RGB LED illuminants and a set of color sensors. An advantage of the present invention is that the system color filters may be of the low-cost film variety. The criteria function includes a matrix of the spectral responses of red, green and blue LED's respectively, and an unknown constant correction vector "n" that is subtracted from the MacAdam's matrix functions and the RGB filter sensitivity functions with an unknown constant matrix "M." The criteria function therefore provides a means to determine system filter performance through evaluation of the unknown constant vectors. If a computer implements step 210, a database may be automatically accessed to obtain various data to construct the criteria function such as the system RGB LED illuminant spectral data and the system filter spectral response data.

In step 220, RGB filter set response characteristics are determined based on the criteria function. Response characteristics include constant terms for the vector "n" and the matrix "M." The criteria function is evaluated to determine values for "M" and "n." In one embodiment, the criteria function is a constraint set criteria function with a minimum value constraint. In the present discussion, the minimum value of the criteria function with constraint set "M" and "n" is a color filter performance index for the system RGB LED illuminants. Therefore, the scalar values of "M" and "n" that result in a minimum value criteria function determine the system color filter performance.

In step, 230 color estimation parameters for substantially optimal color estimation with the RGB filter set are determined based upon the system RGB filter set response characteristics determined in step 210. Step 230, occurs at any time after the determination of "n" and "M" in step 220. Step 230 comprises one or more color estimation parameter determinations. In one embodiment, color estimation parameters includes structures describing localized spectral approximations with weighting functions. In another embodiment, color estimation parameters includes structures describing a new set of estimated tristimulus values of a white light illuminant formed by an RGB LED set. In yet another embodiment, color estimation parameters includes structures describing a color calibration for a color estimation system. Substantially optimal color estimation is sub-optimal estimation that approaches the ideal of the CIE color mixture functions or a linear combination equivalent, while remaining sub-optimal. The color estimation parameters determined in step 230 provide inverse transformation structures that allow substantially optimal color sensing and estimation with low-cost color filters. The criteria function J is generally represented by an equation in the form:

$$\underset{M,n}{J} = \int_\sigma \left| \begin{bmatrix} R_{LED}(\lambda) & 0 & 0 \\ 0 & G_{LED}(\lambda) & 0 \\ 0 & 0 & B_{LED}(\lambda) \end{bmatrix} \begin{bmatrix} \overline{xmc}(\lambda) \\ \overline{ymc}(\lambda) \\ \overline{zmc}(\lambda) \end{bmatrix} - M \begin{bmatrix} r(\lambda) \\ g(\lambda) \\ b(\lambda) \end{bmatrix} - n \right| d\lambda, \quad (1)$$

where $r(\lambda)$, $g(\lambda)$ and $b(\lambda)$ are positive real continuous sensitivity functions of the RGB filter set and $\lambda \in \sigma = [380, 780]$ nm, $R_{LED}(\lambda)$, $G_{LED}(\lambda)$ and $B_{LED}(\lambda)$ are the spectra of red, green and blue LED light sources respectively and where $\overline{xmc}(\lambda)$, $\overline{ymc}(\lambda)$, and $\overline{zmc}(\lambda)$ are a set of color matching functions, and M is a 3×3 constant matrix and n is a 3×1 constant vector.

Figure 3:
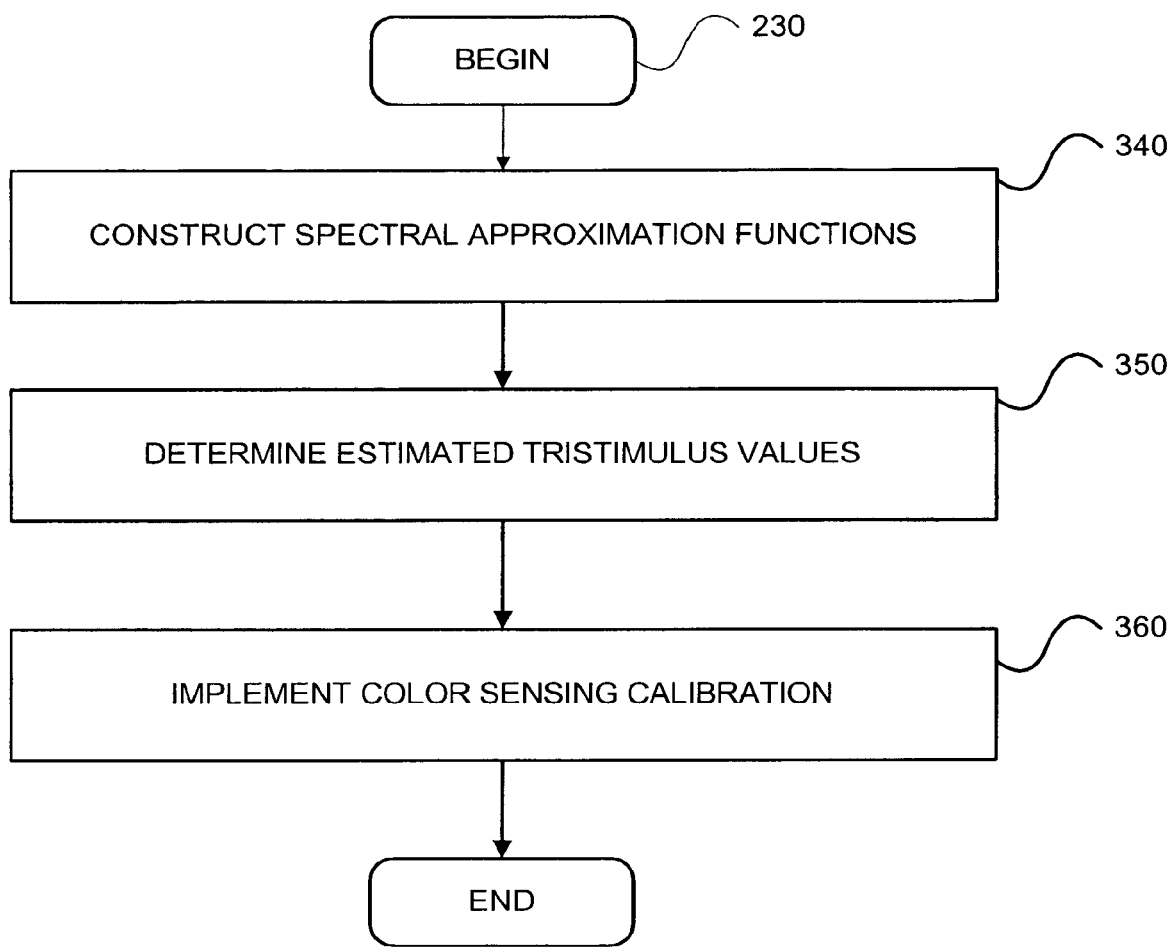
FIG. 3 shows a flow diagram illustrating a process for determining color estimation parameters for RGB LED color sensing.

If a computer implements step 230, a database may be automatically accessed to obtain various data to determine color estimation parameters. FIG. 3 shows a flow diagram illustrating a process for determining color estimation parameters for RGB LED color sensing as in step 230 of FIG. 2. Process 230 begins in step 340. In step 340, spectral approximation functions $\hat{x}$, $\hat{y}$, and $\hat{z}$ for the RGB LED light sources are constructed from the "M" and "n" determined by evaluating the criteria function. The spectral approximation functions include a weighting function. The spectral approximation functions are represented by an equation in the form:

$$\begin{bmatrix} \hat{x} \\ \hat{y} \\ \hat{z} \end{bmatrix} = \left( M \begin{bmatrix} r(\lambda) \\ g(\lambda) \\ b(\lambda) \end{bmatrix} + n \right) * u \left\{ M \begin{bmatrix} r(\lambda) \\ g(\lambda) \\ b(\lambda) \end{bmatrix} + n \right\}, \quad (2)$$

where u is a unit step function.

In step 350, estimated tristimulus values are determined based on the spectral functions estimated in step 340. The system color sensors equipped with the system color filter set estimate the new tristimulus values based on the white light emission of the system RGB LED's. The estimated tristimulus values $\hat{X}$, $\hat{Y}$, $\hat{Z}$ are determined according to the relationship represented by the equation:

$$\begin{bmatrix} \hat{X} \\ \hat{Y} \\ \hat{Z} \end{bmatrix} = \int_\sigma \begin{bmatrix} \hat{X}(\lambda) \\ \hat{Y}(\lambda) \\ \hat{Z}(\lambda) \end{bmatrix} P(\lambda) d\lambda, \quad (3)$$

where $P(\lambda) = R_{LED}(\lambda) + G_{LED}(\lambda) + B_{LED}(\lambda)$.

In step 360, a color sensing calibration is implemented. The calibration occurs after the determination of tristimulus values in step 360. A calibration matrix is determined and applied to correct for error in the system color estimation. The calibration is determined according to the relationship represented by the equation:

$$\begin{bmatrix} X \\ Y \\ Z \end{bmatrix} = M_{cal} M c^{-1} \begin{bmatrix} \hat{X} \\ \hat{Y} \\ \hat{Z} \end{bmatrix} \quad (4)$$

where X, Y and Z are tri stimulus functions of the RGB LED illuminants and where $M_{cal}$ is a calibration matrix and $Mc^{-1}$ is an inverse MacAdam's matrix.

Figure 4:
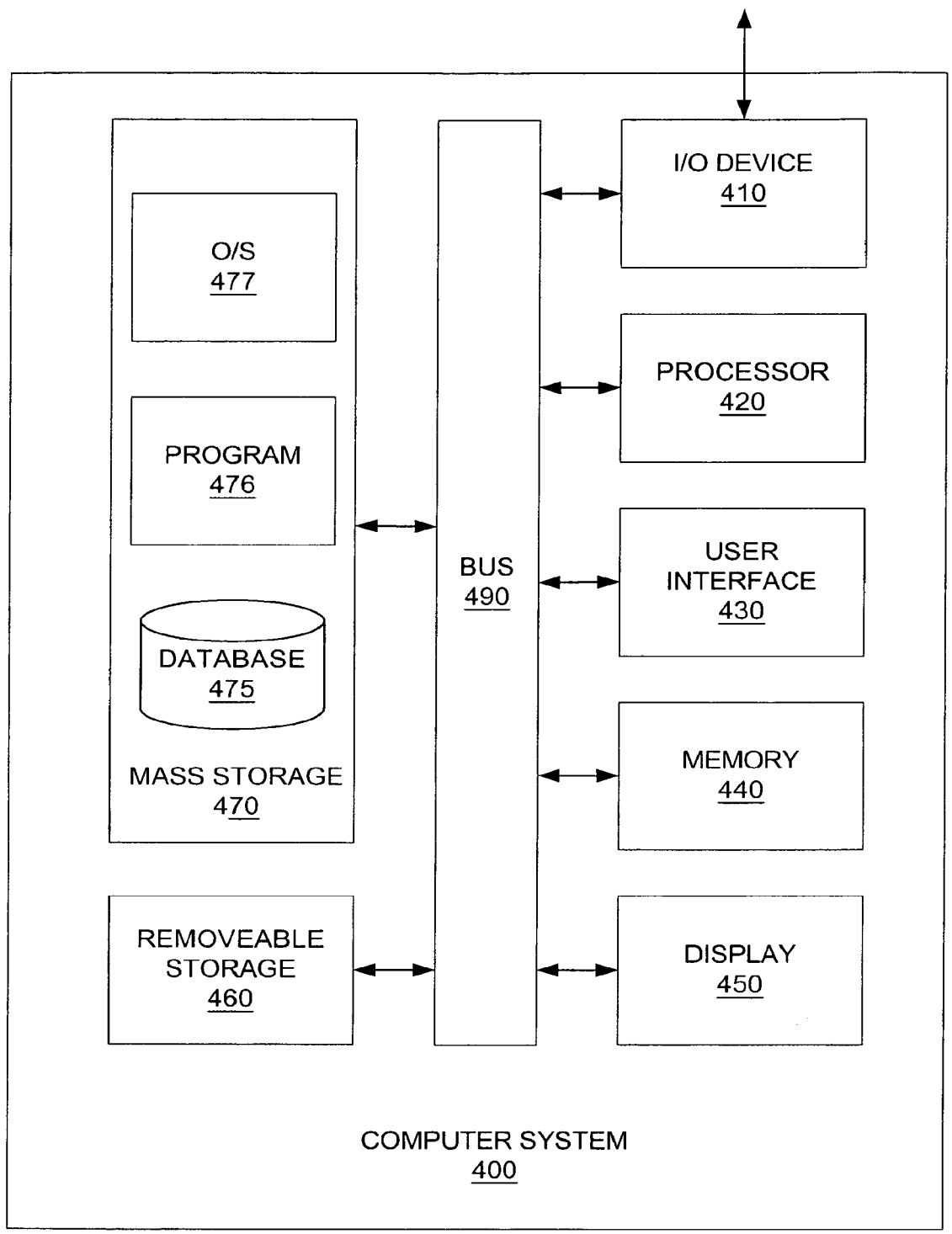
FIG. 4 is a block diagram illustrating an exemplary computer system that may be used to implement the method of the invention.

FIG. 4 is a block diagram illustrating an exemplary computer system 400 that may be used to implement the method of the invention. FIG. 3 shows a computer system 400 containing: an I/O device 410; a processor 420; a user interface 430; memory 440; a display 450; removable storage 460; a bus 490; and, mass storage 470 containing a database 475, programs 476 and an operating system 477. In FIG. 3 the I/O device 410, the processor 420, the user interface 430, the memory 440, the display 450, the removable storage 460 and the mass storage 470 are all shown coupled to the bus 490. The I/O device 410 is additionally shown enabled for communication external to computer system 400.

The I/O device 410 is a device capable of bidirectional data communication with a device external to the computer system 300. Examples of I/O devices include serial, parallel, USB, Ethernet and IEEE 802.11 compliant wireless devices, for example.

The processor 420 is a computing device usually containing memory and data control capability, such as caching and the like. The processor 420 may be integrated with supporting hardware such a video controller, a storage device controller and the like. The processor 420 generally executes instructions of a computer program such as program 476, for example.

The user interface 430 is a device such as a keyboard, a mouse, a pointing device, a pen, a microphone or another device used to provide a data entry interface with a user of the computer system 400.

The memory 440 is a hardware or virtual storage for computer code and data that the processor is manipulating. Memory 440 includes all dynamic memory external to the processor including video memory, additional cache memory and the like. Portions of mass storage 470 may also be used to provide virtual memory that may be used interchangeably with the memory 440.

The display 450 is a visual display such as a CRT, LCD, plasma or projection display used to provide a user with a visual interface with the computer system 400.

The removable media 460 is any device that provides a removable medium for storing computer code or data such as a magnetic disc drive, a writable optical disc drive or the equivalent.

The mass storage 470 is any device that provides storage for computer code and data such as a hard disk drive a recordable optical medium and the like. In one embodiment, the mass storage 470 is provided by a second computer server system over a network (not shown). The mass storage generally contains the operating system 477, programs 476 and may include a database 475. Programs include applications for execution by the computer system 400.

The bus 490 is a bidirectional communication device that enabled data communication between the various devices of computer system 400. The bus may include a processor and other logic devices to enable multiple data clock speeds and protocols depending upon the connected devices.

Figure 5:
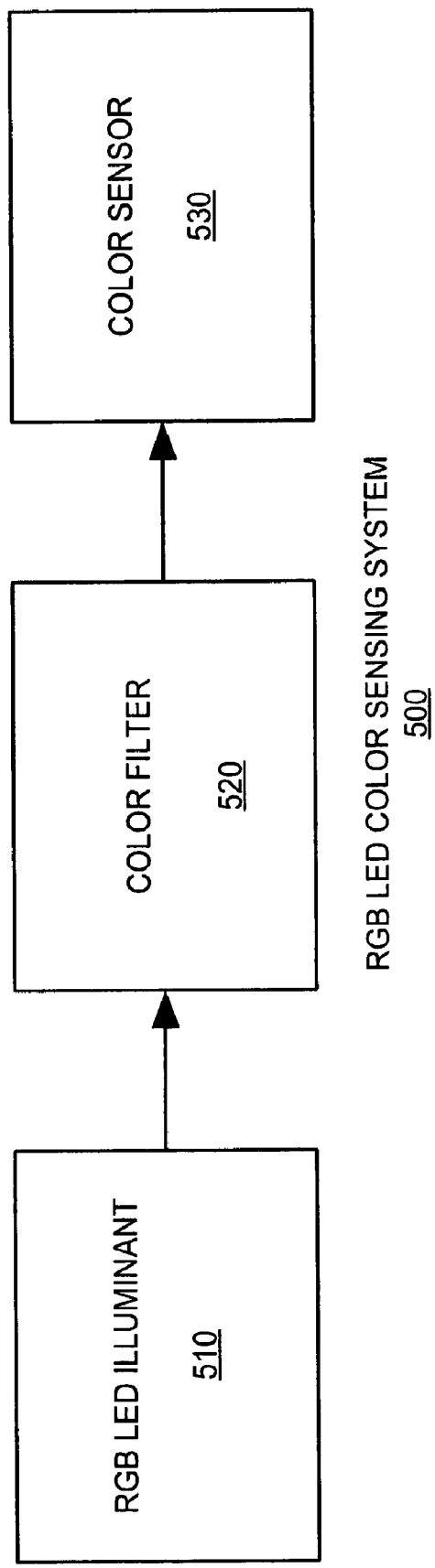
FIG. 5 is a block diagram of an exemplary RGB color sensing and estimation system to which the invention may be applied.

FIG. 5 is a block diagram of an exemplary RGB color sensing and estimation system 500 to which the invention may be applied. In FIG. 5 the color sensing system is comprised of an RGB LED illuminant 510, a color filter 520 and a color sensor 530. The RGB LED illuminant is generally comprised of a trio of a red, green and blue light emitting diodes. The RGB LED's have tristimulus values X, Y and Z respectively. The color filter 520 is generally a trio of red, green and blue filters of the polycarbonate film variety and equivalents. The color sensor is generally a trio of red, green and blue color sensors. Typically, the color filter 520 is attached to the color sensor 530; however, it is not necessary for the operation of the color sensing system 500.

An example of the system and method of the invention in operation is now provided. However, the following illustration is merely an example of the manner in which the invention may be practiced and in no way describes all applications or cites all known embodiments of the invention.

A computer system, such as computer system 400 of FIG. 4, enabled to implement the invention is configured to access a database containing low cost color filter and RGB LED data based on the manufacturer and product code and the like. A user provides other data concerning the color estimation system components, such as specific RGB LED units and color sensor units and the model number of the filter selections. The computer then accesses the filter data and constructs a criteria function. The computer then determines the filter set performance and provides values for "n" and "M." The computer then constructs approximated spectral response functions based on the determined "n" and "M." The computer then calculates estimated new tristimulus values for the approximated spectral response functions. A color calibration matrix is then determined by the computer based upon the estimated tristimulus values and the actual tristimulus values for the system RGB LEDs as provided in the computers database. In this manner, a calibrated substantially optimal color estimator for an RGB LED illumination system is designed.

While the preferred embodiments of the invention have been shown and described, numerous variations and alternative embodiments will occur to those skilled in the art. Accordingly, it is intended that the invention be limited only in terms of the appended claims.

The invention claimed is:

1. In a computer system including a processor, a storage device, and a user interface, a method for determining RGB filter set and color estimation performance for RGB LED color sensing, the method comprising:

the computer system receiving, via the user interface, a user selection of an RGB filter set;

the processor retrieving from a database in the storage device data describing a spectral response for the selected RGB filter set;

the processor constructing a criteria function describing an error between desired color matching functions and the spectral response of the selected RGB filter set;

the processor determining characteristics for the selected RGB filter set based on the criteria function; and the processor determining color estimation parameters for substantially optimal color estimation with the selected RGB filter set based upon the determined response characteristics for the selected RGB filter set.

2. The method of claim 1 wherein determining the response characteristics for the selected RGB filter set comprises evaluating the criteria function to determine the response characteristics for the selected RGB filter set resulting in a minimum value of a constraint set criteria function.

3. The method of claim 2 wherein the criteria function is represented by the equation:

$$J_{M,n} = \int_\sigma \left| \begin{bmatrix} R_{LED}(\lambda) & 0 & 0 \\ 0 & G_{LED}(\lambda) & 0 \\ 0 & 0 & B_{LED}(\lambda) \end{bmatrix} \begin{bmatrix} \overline{xmc}(\lambda) \\ \overline{ymc}(\lambda) \\ \overline{zmc}(\lambda) \end{bmatrix} - M \begin{bmatrix} r(\lambda) \\ g(\lambda) \\ b(\lambda) \end{bmatrix} - n \right| d\lambda$$

wherein $r(\lambda)$, $g(\lambda)$ and $b(\lambda)$ are positive real continuous sensitivity functions of the selected RGB filter set wherein $\lambda \in \sigma = [380, 780]$ nm and wherein $R_{LED}(\lambda)$, $G_{LED}(\lambda)$ and $B_{LED}(\lambda)$ are the spectra of red, green and blue (RGB) LED light sources and wherein $\overline{xmc}(\lambda)$, $\overline{ymc}(\lambda)$, and $\overline{zmc}(\lambda)$ are a set of color matching functions and wherein M is a 3×3 constant matrix and n is a 3×1 constant vector.

4. The method of claim 3 further comprising:
constructing spectral approximation functions $\hat{x}$, $\hat{y}$, and $\hat{z}$ for the RGB LED light sources from the M and n determined by evaluating the criteria function.

5. The method of claim 4 wherein the spectral approximation functions are represented by the equation:

$$\begin{bmatrix} \hat{x} \\ \hat{y} \\ \hat{z} \end{bmatrix} = \left( M \begin{bmatrix} r(\lambda) \\ g(\lambda) \\ b(\lambda) \end{bmatrix} + n \right) * u \left\{ M \begin{bmatrix} r(\lambda) \\ g(\lambda) \\ b(\lambda) \end{bmatrix} + n \right\},$$

and
wherein u is a step function.

6. The method of claim 5 further comprising:
determining estimated tristimulus values for the RGB LED light sources based upon the spectral approximation functions.

7. The method of claim 6 wherein the estimated tristimulus values $\hat{X}$, $\hat{Y}$, $\hat{Z}$ are determined according to the relationship represented by the equation:

$$\begin{bmatrix} \hat{X} \\ \hat{Y} \\ \hat{Z} \end{bmatrix} = \int_\sigma \begin{bmatrix} \hat{x}(\lambda) \\ \hat{y}(\lambda) \\ \hat{z}(\lambda) \end{bmatrix} P(\lambda) d\lambda \text{ wherein } P(\lambda) = R_{LED}(\lambda) + G_{LED}(\lambda) + B_{LED}(\lambda).$$

8. The method of claim 7 further comprising:
implementing a color sensing color calibration through the function represented by the equation:

$$\begin{bmatrix} X \\ Y \\ Z \end{bmatrix} = M_{cal} M c^{-1} \begin{bmatrix} \hat{X} \\ \hat{Y} \\ \hat{Z} \end{bmatrix}$$

wherein X, Y and Z are tristimulus functions of the RGB LED light sources and wherein $M_{cal}$ is a calibration matrix and wherein $Mc^{-1}$ is an inverse MacAdam's matrix.

9. A computer readable medium storing a computer program comprising:
computer readable code for constructing a criteria function describing an error between desired color matching functions and a spectral response of an RGB filter set;
computer readable code for determining RGB filter set response characteristics based on the criteria function; and
computer readable code for determining color estimation parameters for substantially optimal color estimation with the RGB filter set based upon the determined RGB filter set response characteristics.

10. The computer readable medium of claim 9 wherein determining the RGB filter response characteristics comprises evaluating the criteria function to determine the RGB filter response characteristics resulting in a minimum value of a constraint set criteria function.

11. The computer readable medium of claim 10 wherein the criteria function is represented by the equation:

$$J_{M,n} = \int_\sigma \left| \begin{bmatrix} R_{LED}(\lambda) & 0 & 0 \\ 0 & G_{LED}(\lambda) & 0 \\ 0 & 0 & B_{LED}(\lambda) \end{bmatrix} \begin{bmatrix} \overline{xmc}(\lambda) \\ \overline{ymc}(\lambda) \\ \overline{zmc}(\lambda) \end{bmatrix} - M \begin{bmatrix} r(\lambda) \\ g(\lambda) \\ b(\lambda) \end{bmatrix} - n \right| d\lambda$$

wherein $r(\lambda)$, $g(\lambda)$ and $b(\lambda)$ are positive real continuous sensitivity functions of the RGB filter set wherein $\lambda \in \sigma = [380, 780]$ nm and wherein $R_{LED}(\lambda)$, $G_{LED}(\lambda)$ and $B_{LED}(\lambda)$ are the spectra of red, green and blue LED light sources and wherein $\overline{xmc}(\lambda)$, $\overline{ymc}(\lambda)$, and $\overline{zmc}(\lambda)$ are a set of color matching functions and wherein M is a 3×3 constant matrix and n is a 3×1 constant vector.

12. The computer readable medium of claim 11 further comprising:
computer readable code for constructing spectral approximation functions $\hat{x}$, $\hat{y}$, and $\hat{z}$ for the RGB LED light sources from the M and n determined by evaluating the criteria function for the RGB filter set.

13. The computer readable medium of claim 12 wherein the spectral approximation function equation is:

$$\begin{bmatrix} \hat{x} \\ \hat{y} \\ \hat{z} \end{bmatrix} = \left( M \begin{bmatrix} r(\lambda) \\ g(\lambda) \\ b(\lambda) \end{bmatrix} + n \right) * u \left\{ M \begin{bmatrix} r(\lambda) \\ g(\lambda) \\ b(\lambda) \end{bmatrix} + n \right\}$$

wherein u is a step function.

14. The computer readable medium of claim 13 further comprising:
computer readable code for determining estimated tristimulus values for the RGB LED light sources based upon the spectral approximation functions.

15. The computer readable medium of claim 14 wherein the estimated tristimulus values $\hat{X}$, $\hat{Y}$, $\hat{Z}$ are determined according to the relationship represented by the equation:

$$\begin{bmatrix} \hat{X} \\ \hat{Y} \\ \hat{Z} \end{bmatrix} = \int_\sigma \begin{bmatrix} \hat{x}(\lambda) \\ \hat{y}(\lambda) \\ \hat{z}(\lambda) \end{bmatrix} P(\lambda) d\lambda \text{ wherein } P(\lambda) = R_{LED}(\lambda) + G_{LED}(\lambda) + B_{LED}(\lambda).$$

16. The computer readable medium of claim 15 further comprising:
computer readable code for implementing a color sensing color calibration through the function represented by the equation:

$$\begin{bmatrix} X \\ Y \\ Z \end{bmatrix} = M_{cal} M c^{-1} \begin{bmatrix} \hat{X} \\ \hat{Y} \\ \hat{Z} \end{bmatrix}$$

wherein X, Y and Z are tristimulus functions of the RGB LED light sources and wherein $M_{cal}$ is a calibration matrix and wherein $Mc^{-1}$ is an inverse MacAdam's matrix.

17. A system for determining RGB filter set and color estimation performance for RGB LED color sensing comprising:
- a storage device for storing data describing spectral responses of a plurality of RGB filter sets;
- a user interface for receiving a user selection of one of the RGB filter sets;
- a processor configured: to construct a criteria function describing an error between desired color matching functions and the spectral response of the selected RGB filter set; to determine response characteristics for the selected RGB filter set based on the criteria function; and to determine color estimation parameters for substantially optimal color estimation with the selected RGB filter set based upon the determined response characteristics for the selected RGB filter set.

18. The system of claim 17, wherein the criteria function is represented by the equation:

$$J_{M,n} = \int_\sigma \left| \begin{bmatrix} R_{LED}(\lambda) & 0 & 0 \\ 0 & G_{LED}(\lambda) & 0 \\ 0 & 0 & B_{LED}(\lambda) \end{bmatrix} \begin{bmatrix} xmc(\lambda) \\ ymc(\lambda) \\ zmc(\lambda) \end{bmatrix} - M \begin{bmatrix} r(\lambda) \\ g(\lambda) \\ b(\lambda) \end{bmatrix} - n \right| d\lambda$$

wherein $r(\lambda)$, $g(\lambda)$ and $b(\lambda)$ are positive real continuous sensitivity functions of the selected RGB filter set wherein $\lambda \in \sigma =$ [380, 780] nm and wherein $R_{LED}(\lambda)$, $G_{LED}(\lambda)$ and $B_{LED}(\lambda)$ are the spectra of red, green and blue (RGB) LED light sources and wherein $\overline{xmc}(\lambda)$, $\overline{ymc}(\lambda)$, and $\overline{zmc}(\lambda)$ are a set of color matching functions and wherein M is a 3×3 constant matrix and n is a 3×1 constant vector.

19. The system of claim 18 wherein the processor is configured to construct spectral approximation functions $\hat{x}$, $\hat{y}$, and $\hat{z}$ for the RGB LED light sources from the M and n determined by evaluating the criteria function.

20. The system of claim 19 further comprising:
- means for implementing a color sensing color calibration through the function represented by the equation:

$$\begin{bmatrix} X \\ Y \\ Z \end{bmatrix} = M_{cal} M c^{-1} \begin{bmatrix} \hat{X} \\ \hat{Y} \\ \hat{Z} \end{bmatrix}$$

wherein X, Y and Z are tristimulus functions of the RGB LED light sources and wherein $M_{cal}$ is a calibration matrix and wherein $Mc^{-1}$ is an inverse MacAdam's matrix.

* * * * *